United States Patent [19]
Thiemer et al.

[11] Patent Number: 5,160,607
[45] Date of Patent: Nov. 3, 1992

[54] FILTER FOR AQUARIUM

[75] Inventors: Helmut Thiemer, Allersberg; Walter Schöttner, Deizisau; Peter Voss, Kirchheim/Teck, all of Fed. Rep. of Germany

[73] Assignee: Eheim GmbH & Co. KG, Deizisau, Fed. Rep. of Germany

[21] Appl. No.: 690,716

[22] Filed: Apr. 24, 1991

[30] Foreign Application Priority Data

Apr. 26, 1990 [DE] Fed. Rep. of Germany ....... 4013324

[51] Int. Cl.⁵ .............................................. A01K 63/04
[52] U.S. Cl. .................... 210/128; 210/130;
         210/169; 210/416.2; 119/5
[58] Field of Search ............ 210/123, 169, 130, 416.2,
         210/128; 119/4, 5

[56] References Cited
U.S. PATENT DOCUMENTS 4,156,401  5/1979  Ogui ....................... 210/169
4,498,417  2/1985  Richter ...................... 119/5
5,098,585  3/1992  Woltman et al. ............... 210/169

FOREIGN PATENT DOCUMENTS 2700030  7/1978  Fed. Rep. of Germany .

*Primary Examiner*—Peter Hruskoci
*Assistant Examiner*—Robert James Popovics
*Attorney, Agent, or Firm*—Michael J. Striker

[57] ABSTRACT

A filter for aquarium has a housing having a bottom chamber and at least one filter compartment for a filter material located above the bottom chamber, a supply arranged so that water is supplied from above so as to pass the filter compartment and float to the bottom chamber, a pump for pumping water from the bottom chamber back into the aquarium, so that the filter operates as alternating lifting-lowering filter. Each of the filter compartments has at least one overflow aspiration lifting device with an inlet located at a base side and substantially at a height of a bottom of the filter compartment and an outlet which opens downwardly toward a next one of the filter compartments.

65 Claims, 4 Drawing Sheets

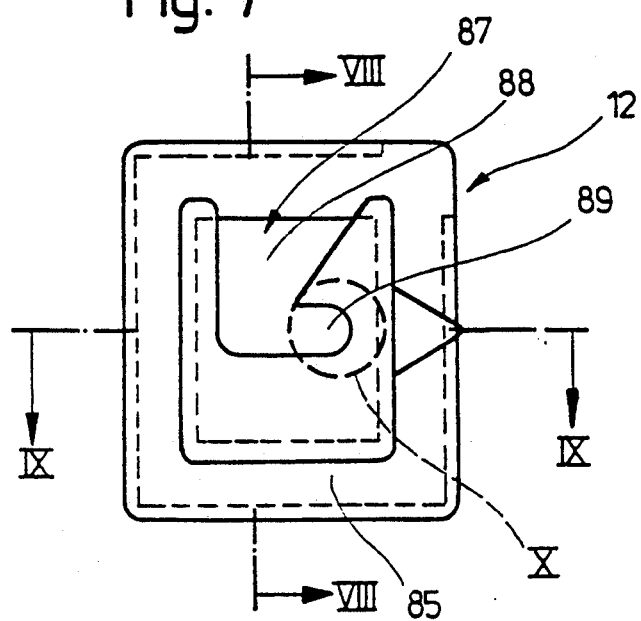
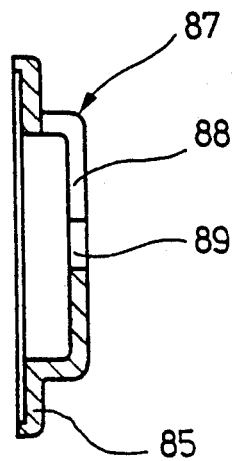
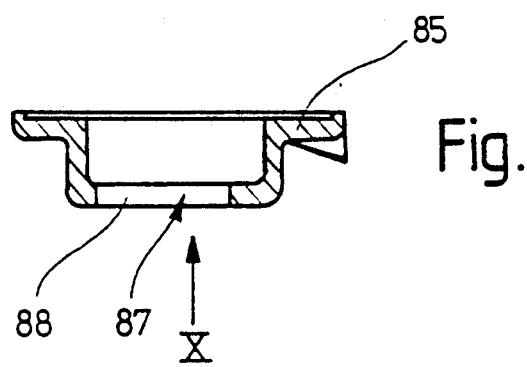
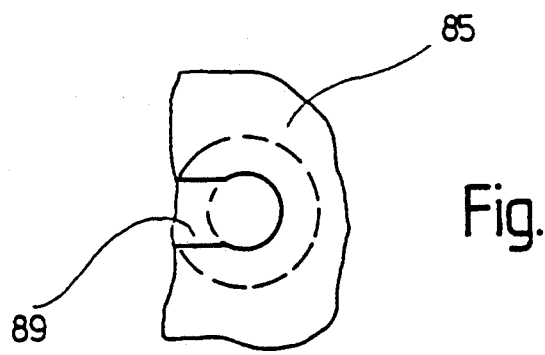

FILTER FOR AQUARIUM

BACKGROUND OF THE INVENTION

The present invention relates to a filter for an aquarium.

More particularly it relates to a filter for an aquarium which has a housing with a bottom chamber and at least one filter compartment with a filter material, a water supply for supplying water from above into the filter compartment so that the water passes at least one filter compartment and is supplied to the bottom chamber, and then aspirated from the bottom chamber by a pump and recirculated back to the aquarium through a conduit.

Filters of the above mentioned general type are known in the art. One of such filters is disclosed for example in the German Patent 2,700,030 and operates as an alternating lifting-lowering filter. This filter is formed as an outer filter and connected through a supply conduit with the aquarium tank. The filter has only one filter compartment. The supply is performed from above into a space above the filter compartment. Under the filter compartment there is a bottom chamber, and a reverse U-shaped conduit opens with its free end into the bottom chamber. A pump is connected with the conduit, aspirates water accumulated in the bottom chamber and supplies it back through a return conduit leading to the aquarium tank Furthermore, for safety reasons for the case of a clogging of the filter compartment between the upper space with the supply and the bottom chamber, a bypass conduit is provided and operates so that when the filter compartment is clogged the upwardly supplied water flows directly through the bypass conduit downwardly into the bottom chamber. The aspiration of the water is performed always in the region of the bottom chamber through the open end of the U-leg located there. During the aspiration cycle the water level lowers in the filter compartment downwardly. The discharge quantity per time unit is greater than the supply quantity per time unit. Due to this design a well know lifting-lowering operation of the filter is obtained. The filter however is complicated with respect to the devices for actuating the lifting-lowering function since the reverse U-shaped pipe connected to the pump extends in the filter mass of the filter compartment with its both legs.

SUMMARY OF THE INVENTION

Accordingly, it is an object of the present invention to provide a filter for an aquarium of the above mentioned general type which avoids the disadvantages of the prior art.

More particularly, it is an object of the present invention to provide the filter of the above mentioned general type which operates to perform the lifting-lowering function, is simple and cost-favorable, insures a long operation of the filter, and the filter can be removed from each filter compartment when needed with no problems whatsoever for the user, and also a layman.

In keeping with these objects and with others which will become apparent hereinafter, one feature of the present invention resides, briefly stated, in a filter for an aquarium in which each compartment has at least one overflow aspiration lifting device with an inlet located at a base side and substantially at the height of the bottom of the filter compartment and with an outlet which opens downwardly to a next filter compartment or the bottom chamber.

The overflow aspiration lifting device provided in each filter compartment is simple and operationally reliable. It needs little space in the filter compartment, so that the filter compartment can accommodate a great volume of the filter material. The filter is operationally reliable and works for a long time. When cleaning or the like is required, the layman can dismount the individual components of the filter very fast.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 7 is an enlarged side view of a mounting plate of the filter in accordance with the present invention;

FIGS. 8 and 9 are sections taken along the lines VIII—VIII and IX—IX in FIG. 7; and FIG. 10 is an enlarged side view of the detail X in FIG. 7.

DESCRIPTION OF THE PREFERRED EMBODIMENTS

Figure 1:
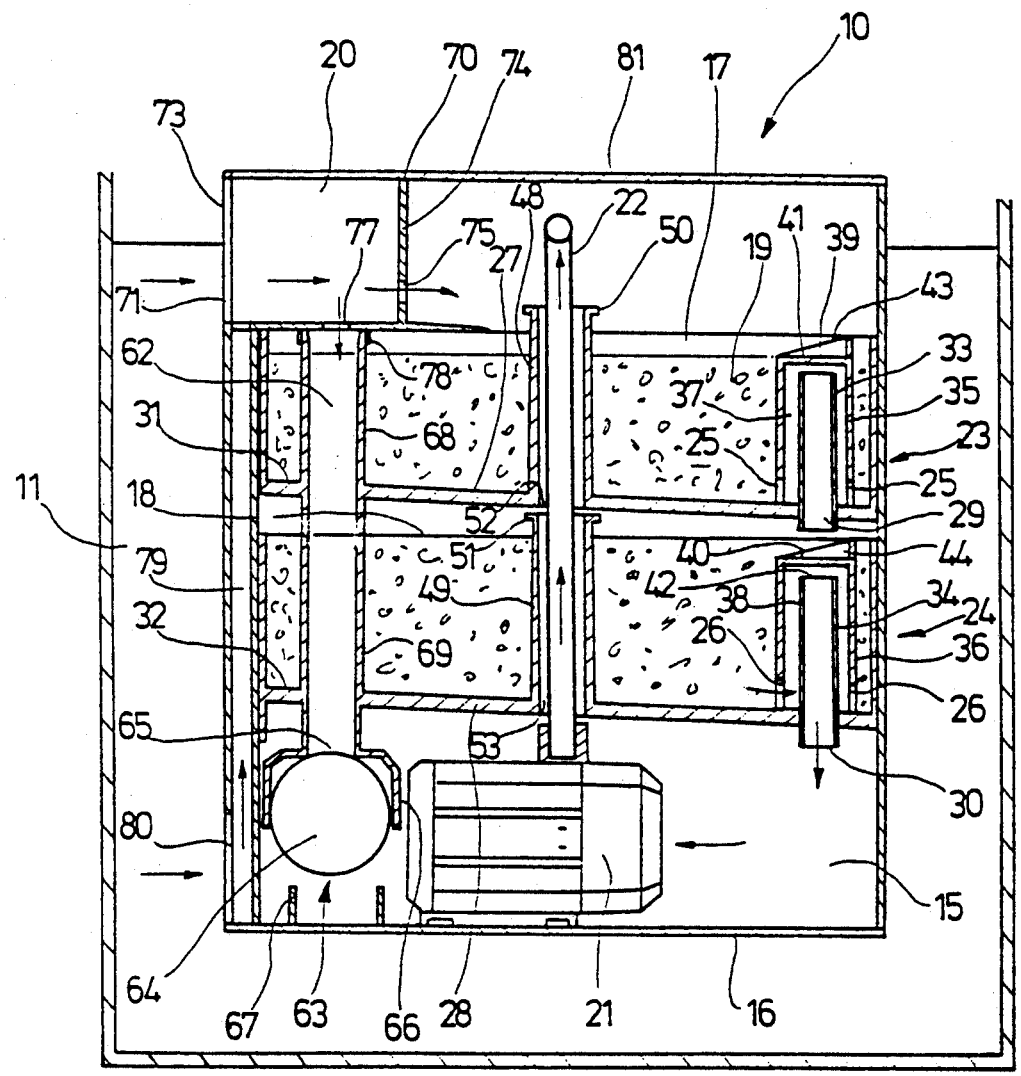
FIG. 1 is a schematic side view of an inner filter in an aquarium with a partial section in a simplified form.

A filter in accordance with the present invention is schematically shown in the drawings and identified with reference numeral 10. The filter is shown as used for an aquarium, and in particular is formed as an inner filter. The inner filter is accommodated in a schematically shown aquarium tank 11 and removably mounted on an aquarium wall by two identical suspending holders 12.

The filter has a substantially box-shaped housing 14, for example of synthetic plastic material. A bottom chamber 15 with a closed bottom 16 is located in the lower area of the housing 14. At least one filter compartment is provided above the bottom chamber 15. In the shown embodiment two vertically arranged filter compartments 17 and 18 are located one above the other and both contain a filtering material 19, for example stone, gravel and the like. Surrounding water is supplied to the upper filter compartment 17 through a supply 20 in the direction of the arrow from the aquarium tank 11. It is supplied from above with respect to the upper filter compartment 17. Water, after passing the upper filter compartment 17 is supplied to the filter compartment 18 located underneath and then after passing the filter compartment 18 is supplied to the bottom chamber 15 located below. Then it is aspirated from the bottom chamber 15 by a pump 21. The aspirated water is supplied by the pump 21 to the aquarium tank 11 through a conduit 22. The filter 10 operates in a known manner as alternating lifting-lowering filter.

An important special feature of the filter 10 is that each of the filter compartments 17, 18 has at least one overflow aspiration lifting device 23, 24. The overflow aspiration lifting device 23, 24 operates in accordance with the principle of the lift loop, or also the principle of pipette sprayer. Each device 23, 24 can be considered as a siphon placed on its head. Details of the devices will be explained hereinbelow. In each overflow aspirating lifting device 23, 24 its inlet 25, 26 is arranged at the base side and substantially at the height of the bottom 26, 28 of the filter compartment 17, 18. The outlet 29 opens to the filter compartment 18 located underneath, while the outlet 30 of the lowermost filter compartment 18 opens to the bottom chamber 15 and supplies the latter. In each filter compartment 17, 18 the overflow aspiration lifting devices 23, 24 are located at one side and in all filter compartments, 17, 18 on the same side, so that in a vertical direction they are located one above the other. The bottoms 27, 28 are inclined relative to the inlet 25 26 of the associated overflow aspiration lifting device 23, 24.

Each filter compartment 17, 18 has a filter container 31 32 which is formed as a substantially open path. The filter containers are formed identically, exchangeable with one another and also exchangeable in the housing 14 and removable easily and without problems for example for cleaning purposes. Both the housing 14 and the filter container 31, 32 are composed for example of synthetic plastic material and formed as synthetic plastic extrusion parts.

Each overflow aspiration lifting device 23, 24 has an outlet pipe 33, 34 which projects from the bottom 27, 28 and extends vertically. The lower end of the outlet pipe 33, 34 extends outwardly beyond the bottoms 27, 28 and forms an outlet 29, 30 with the open pipe end. The outlet pipe 33, 34 is a one-piece part of the bottom 27, 28.

Figure 2:
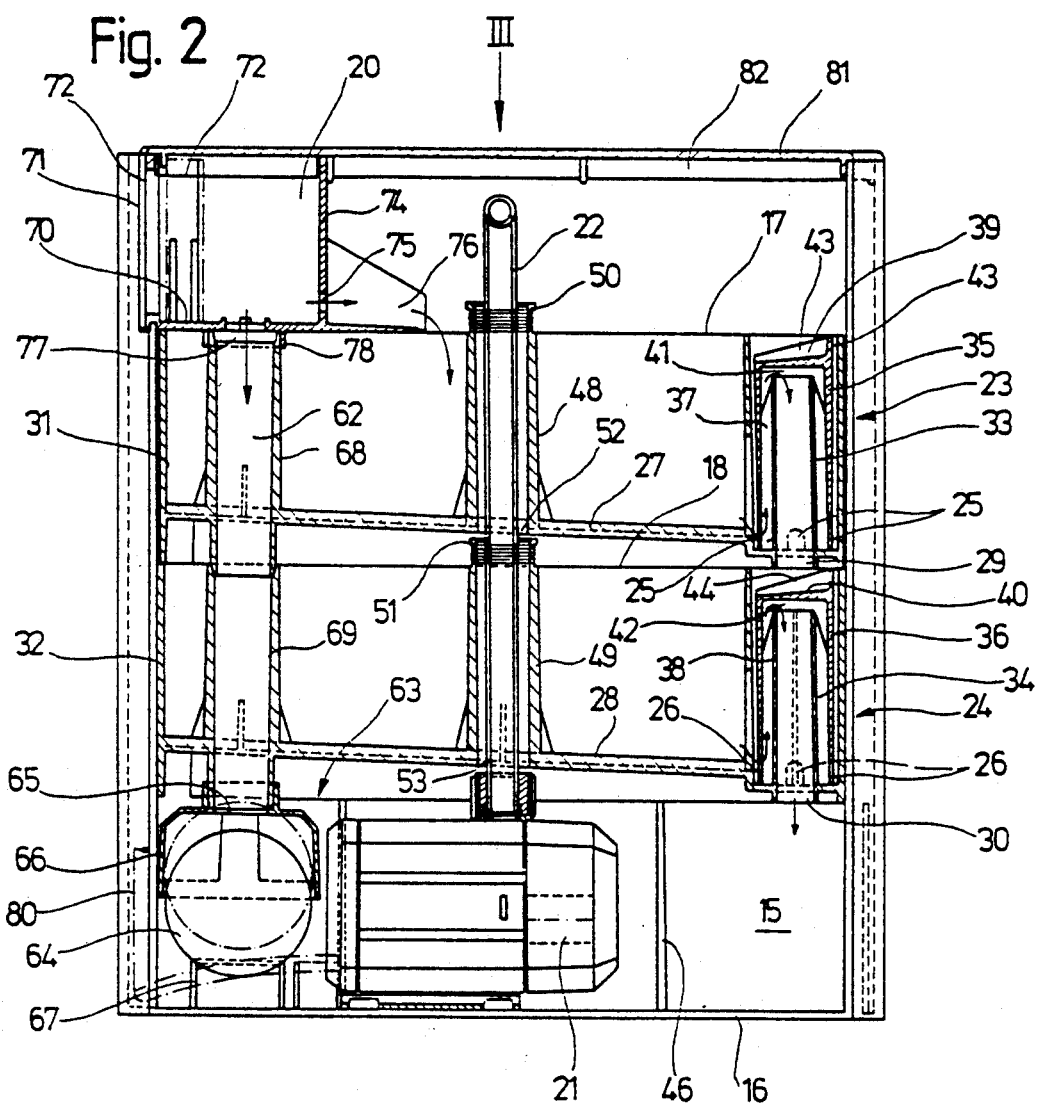
FIG. 2 is a schematic, partial side view of the inner filter of FIG. 1 showing respective details.

Furthermore, each overflow aspiration lifting device 23, 24 has an outer pipe 35, 36 which is closed at its upper side. The outer pipe 35, 36 is fitted over the outlet pipe 33, 34 so as to form a radial ring chamber 37, 38. A closed upper side 39, 40 of the outer pipe 35, 36 extends above the open upper end of the outlet pipe 33, 34 at a distance from it, so as to form an axial overflow chamber 41, 42. It is clear that the respective upper side 39, 40 of the outer pipe 35, 36 extends with a slope in FIGS. 1 and 2 from the right inclinedly to the left and downwardly to the filter container 31, 32, so that water flowing from above is deviated to the left. The respective an outer pipe 35, 36 has upwardly projecting guiding walls 43, 44 provided at its upper side 39, 40 and limiting an inclined water guiding trough. The respective outer pipe 35, 36 can be designed at the upper side with a cross-section substantially similar to a shovel. The guiding walls 43, 44 form a leftwardly open U as shown in FIGS. 1 and 2 and enhance the withdrawal of the water which is supplied from above.

Each outer pipe 35, 36 has bottom side passage in its tubular wall, which is designed substantially as torus-arcs. These passages form in each overflow aspiration lifting device 23, 24, its inlet 25, 26. The torus-arc-shaped inlets 25, 26 subdivide each outer pipe 35, 36 in the peripheral direction. Due to this, water standing in respective filter containers 31, 32 can raise through into the ring chamber 37, 38. Thereby with increasing water level in respective filter containers 31, 32, also the water level in this ring chamber 37, 38 raises correspondingly until the axial overflow chamber 41, 42 and the upper end of the outlet pipe 33, 34 is reached. When this is the case that the water reaches the apex point of the lift loop, the water snaps in the outlet pipe 33, 34 through which it flows, and the water leaves the outlet pipe 33, 34 at the upper end through its outlet 29, 30.

When this snapping-over situation occurs, the water runs from the upper filter container 31 to the lower end of the valve pipe 33. It empties in this manner the upper filter container 31 in a relatively impact-like manner through the overflow aspiration lifting device 23 downwardly and into the filter container 32 located underneath. The supply quantity of the water which is supplied into the upper filter container 31 is smaller than the discharge quantity. In accordance with the above described principle, also the lower filter container 32 empties through the overflow aspiration lifting device 24 during reaching the snapping over level, and the emptying is performed through the outlet 30 into the bottom chamber 15. The pump 21 pumps water from there through the conduit 22 out of the bottom chamber 15 and leads this water again back to the aquarium tank 11. The pump 21 runs continuously, and it continuously pumps water through the conduit 22 back into the aquarium tank 11.

When the upper filter container 31 is emptied in the above described manner through the overflow aspiration lifting device 23 in the next following filter container 32, the water level lowers above the bottom 27 toward the bottom. Thereby air is taken into the filter container 31. The outer surfaces of the filter material 19 takes up air oxygen. Subsequently in the emptying cycle the upper filter container 31 is filled, and through the inlet 20 water is also supplied to it from the aquarium tank 11 to the level at which the snapping-over of the overflow aspiration lifting device 23 takes place.

The respective an outer part 35, 36 is a separate structural element and inserted in a releasable manner. The bottom chamber 15 has supporting webs 45, 46 projecting from their side wall parts and vertically supporting the filter container 32. The filter containers 31, 32 are placed over one another in a vertical direction and designed so that the lower filter container 32 can vertically support the filter container 31 located over it. The pump 21 arranged inside the bottom chamber 15 is there completely isolated, including the cable which leads to it.

The water from the bottom chamber 15 is pumped back into the aquarium tank 11 through the conduit 22 connected with the pump 21. The conduit 22 extends centrally through the housing 14 and from the pump 21 through the bottom chamber 15 and both filter containers 31, 32 until it extends upwardly through the height of the supply 20. The conduit 22 above the filter container 31 extends through a housing wall 47 outwardly. Each individual filter container 31, 32 has for example one-piece pipe part 48, 49 extending upwardly from the bottom 27, 28. When needed, the pipe part 48, 49 extends with its upper end beyond the upper edge of the filter container 31, 32 and has at its edge a handle 50, 51 for grasping. Thereby it can be easily grasped and respective filter container 31, 32 can be lifted out of the housing 14. The conduit 22 extends upwardly through an opening 52, 53 in the bottom 27, 28 and through the pipe part 48, 49 of each filter container 31, 32.

Figure 3:
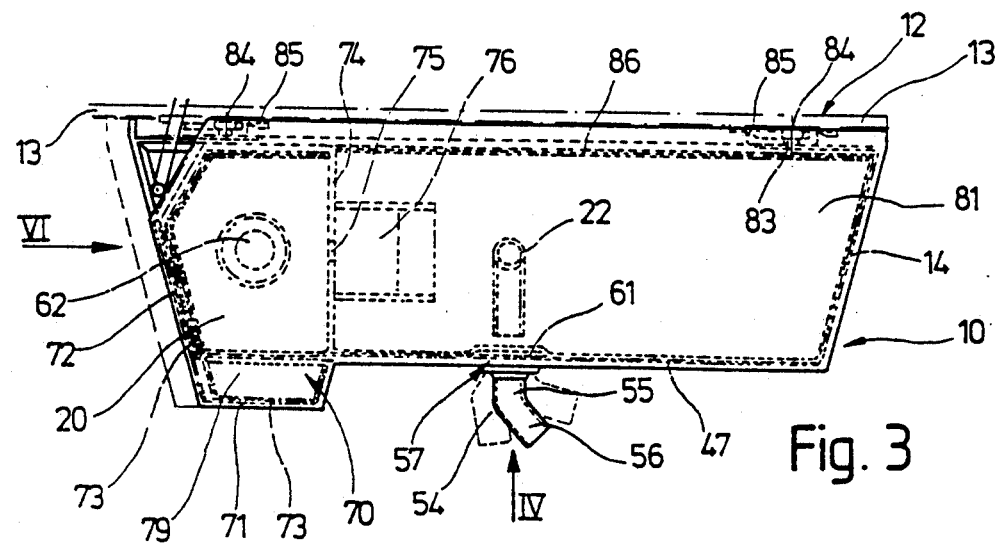
FIG. 3 is a plan view as seen in the direction of the arrow III in FIG. 2.
Figure 6:
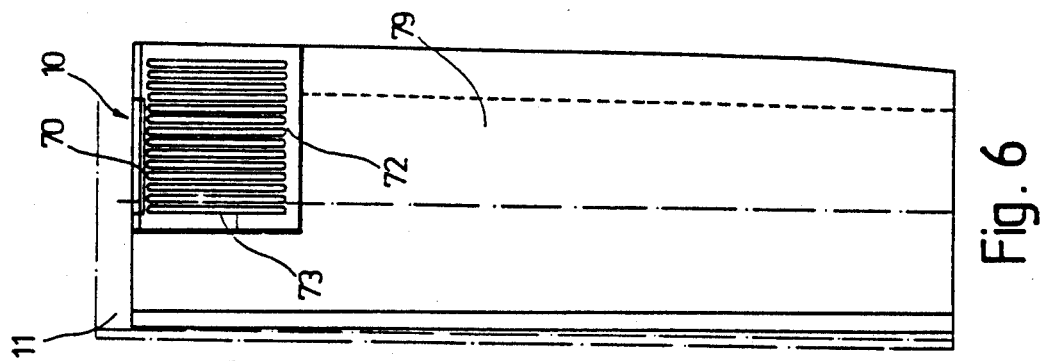
FIG. 6 is a side view in direction of the arrow VI in FIG. 3.

In its outlet region the conduit 22 has a movable outlet pipe 54 which is adjustable in correspondence with the local conditions. It is composed of two pipe pieces 55 and 56 which are arranged at an obtuse angle relative to one another and formed of one-piece with one another. It is adjustably held by means of a spherical joint 57. The spherical joint 57 has a spherical trough 59 provided on a tubular part 58 and a spherical segment 60 provided on the outlet pipe 54, and turnably movable in the spherical trough 59. The tubular part 58 with the spherical trough 59 therefore forms a one-piece unit. Together with the outlet pipe 54 with its spherical segment 60 inserted in the spherical trough 59, it is releasably insertable into a recess 61 in the housing wall 47. The recess 61 is preferably open from above. The outlet pipe 54 is located at a distance above the supply 20. When needed the outlet pipe 54 can be turned by the spherical joint 57 so that the outlet opening of the pipe pieces 56 is in the desired position. If for example the filter 10 is arranged on a wide wall of the aquarium tank 11, then an outflow in the region of the pipe piece 56 is desired substantially parallel to the wide wall of the aquarium tank 11. For this purpose the outlet pipe 54 can be turned to the position shown in broken line in FIG. 3, in which the pipe piece 56 extends at least in a substantially horizontal position parallel to the housing wall 47. It is to be understood that a turning position to the left instead of FIG. 3 to the right, can be obtained as well.

When instead the filter 10 is mounted for example on a small wall of the aquarium tank 11, an outflow in the region of the pipe piece 56 is desired substantially perpendicularly to the housing wall 47 and thereby substantially parallel to the wide wall of the aquarium tank 11. For this purpose the outlet pipe 54 in the spherical pivot 57 is turned so that the pipe piece 56 is oriented substantially perpendicularly to the housing wall 47. This position is shown in a dash-dot line in FIG. 3. It is to be understood that when needed, the outlet pipe 54 can be turned in the spherical joint 57 so that the pipe piece 56 is oriented for example inclinedly downwardly in direction toward the bottom of the aquarium tank 11. Also other turning positions of the outlet pipe 54 are possible when needed.

The filter 10 is further provided with at least one bypass conduit 62 which connects the bottom chamber 15 with the inlet 20. At the end leading to the bottom chamber 15 the bypass conduit 62 has a valve device 63 which is controlled by a float 64. The float is formed for example as a floating ball composed of Styropor. The floating ball has a relatively great diameter Thereby it provides a noise-free operation The spherical float 64 operates so that depending on the water level in the bottom chamber 15 and a corresponding float position, it closes the opening 65 of the conduit end of the bypass conduit 62 as shown in FIG. 1 and identified with dash-dot lines in FIG. 2. With the lowering water level in the bottom chamber 15 it releases the same as shown in FIG. 2 in solid lines. The bypass conduit 62 and the control device 63 controlled by the float 64 prevents a dry running of the pump 21 when for example in the bottom chamber 15 not sufficiently enough water is admitted from the upper filter container 33. Then the float 64 drops to its open position shown in FIG. 2, and water which is permanently supplied through the supply 20 is sucked through the bypass conduit 62 in the direction of the arrow into the bottom chamber 15 and withdrawn through the conduit 22. When the water level in the bottom chamber 15 is again raised, the float 64 floats until it closes the opening 65 at the lower end of the bypass conduit 62. In this position no water can be sucked through the bypass conduit 62 from the pump 21. Since the pump 21 operates continuously the turbulences of the supply quantity and withdrawal quantity of the water can be compensated. A suction of air is prevented through the bypass conduit 62 and the valve device 63 controlled by the float. Therefore on the one hand damages to the pump 21 are avoided and on the other hand a bubble effect which is not desired in the aquarium is prevented. It is to be clear that the bypass conduit 62 with the valve device 63 controlled by the float does not affect the operation of the filtering process itself.

The spherical float 64 is freely movably held in a cage 66 on the lower conduit end of the bypass conduit 62. The case 66 is formed for example of molded, finger-like webs and the like. The cage 66 insures that the spherical float 64 is oriented always coaxially with respect to the bypass conduit 62 and remains in this position. Base webs 67 extend from the bottom 16 of the bottom chamber 15, so that the float 64 is vertically supported in its open position shown in FIG. 2 and in some cases is guided in order to maintain a coaxial orientation with respect to the bypass conduit 62.

The bypass conduit 62 is composed of individual pipe pieces 68, 69 engaging into one another and preferably formed of one piece on the associated filter containers 31 and 32. The upper pipe piece 68 extends downwardly beyond the bottom 27 and ends in a narrowing end, which is inserted in the upwardly open end of the pipe piece 69 of the filter container 32. The opening 65 is formed on the pipe piece 69 which extends downwardly over its bottom, and the cage 66 is fitted on it.

The supply 20 has a cage 70 which is preferably releasably inserted above the upper filter container 31 and is substantially box-shaped. Its front wall 71, and for example inclined side wall 72, have openings 73 formed for example as vertically oriented slots, for the inflow of surrounding water in the cage 70. The cage 70 has an outlet opening 75 in its inner transverse wall 74 close to the bottom. The size of the outlet opening 75 provides the inflow quantity of the water in the filter 10. The opening cross-section of the outlet opening 75 can be adjustable when needed. However, as a rule it is not desired, so that the outlet opening 75 can be fixed for example in form of a bore-hole and is not influenced by the user. A guiding trough 76 which has a substantially U-shaped cross-section and leads further to the housing interior is connected with the inner transverse wall 74 and used for the supplying water. The guiding trough 74 can overlap the upwardly open upper filter container 31 in a roof-shaped manner. It can lead substantially to its center so that the discharge of the water passing through the outlet opening 75 is performed into the filter container 31 located underneath. The cage 70 has on its lower side an outlet pipe 78 which surrounds a bottom opening 77. The upwardly open pipe piece 68 of the upper filter container 31 is connected with it so that the connection of the bypass conduit 62 to the cage 70 is obtained.

The filter has an outer passage 79 which is closed with respect to the interior of the housing 14. With consideration of FIGS. 2 and 3, it can be placed for example on the left front side of the housing 14. The outer passage 79 leads from the level of the bottom 16 upwardly to the supply 20 with the cage 70, wherefore the box-shaped interior of the cage 70 is in communication with the outer passage 79. The outer passage 79 is provided in its lower region near the bottom 16 with the openings 80, for example formed as slots, for the inflow surrounding water into the outer passage 79. The outer passage 79 with the openings 80 located above the level of the bottom 16 therefore provide a deep suction. Then the aquarium water flows through the openings 80 into the outer passage 79 and from there upwardly into the region of the supply 20 with the cage 70. When due to impurities or other disturbances the upper inflow in form of the opening 73 in the walls 71 and 72 is closed or the cross-section is at least strongly reduced, then water can be sucked from the aquarium tank 11 by the deep suction through the openings 80 in the lower region of the outer passage 79. It flows in the supply 20 with the cage 70 depending on the position of the float-controlled valve device 63, through the bypass conduit 62 to the bottom 21, and from there back through the conduit 22 in the aquarium tank 11. The bypass conduit 62 and its float-control valve device 63 insures also a disturbance-free running of the pump 21 and water circulation, when for example both filter containers 31, 32 must be added and only very low quantity of water passes in the vertical direction in the lift-lower operation Then the level in the bottom chamber 15 is reduced, so that the float 64 is transferred to the opening position and the pump 21 sucks water through the bypass conduit 62. This water goes from the supply 20 with the cage 70 and is supplied in it through the openings 73 and/or through the openings 80 in the outer passage 79 and then through the latter.

The housing 14 is closed at an upper end with a releasable cover 81. As schematically shown in FIG. 2, the cover 81 can be provided with an insulating plate 82, for example in its inner side, to insure additional noise suppression and insulation. The insulating plate 82 can be composed for this purpose of a suitable insulating material. The inner side can be formed with individual pyramidal projections or designed in any suitable way for increased insulation. Instead, the cover 81 can be formed as an insulating plate itself and provided for example with the above mentioned projections.

Figure 4:
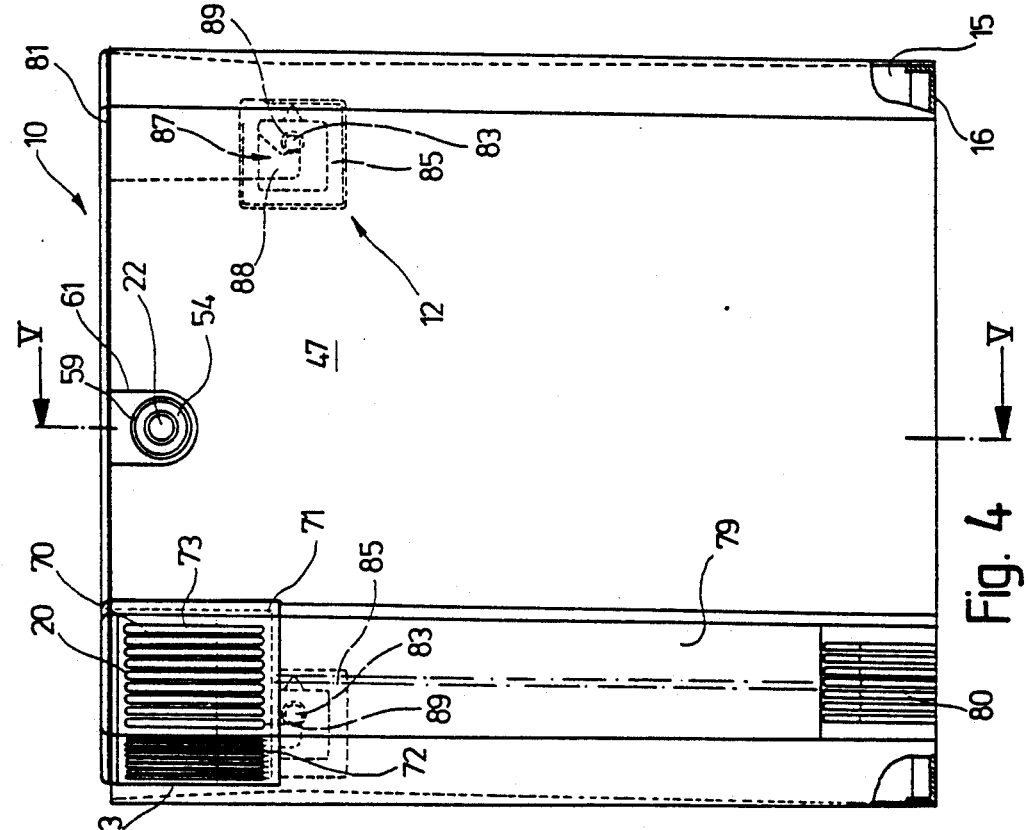
FIG. 4 is a front view in a direction of the arrow IV in FIG. 3.
Figure 5:
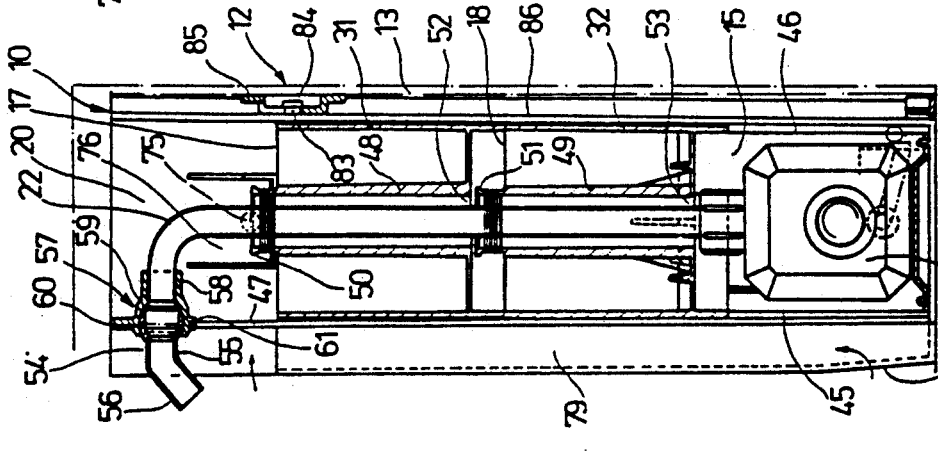
FIG. 5 is a schematic section taken along the line V—V in FIG. 4.

The suspension holders 12 for releasably suspending the filter 10 on the aquarium wall 3 are provided at two locations which are spaced from one another in horizontal direction and are identical. Each suspension holder 12 has on the one hand a projection 83 with a mushroom shaped thickened head 84, and on the other hand an associated mounting plate 85. The projection 83 with the thickened head 84 is mounted, for example releasably, on the rear wall 86 of the housing 14. The associated mounting plate 85 is mounted on a wall of the aquarium tank 11, for example by adhesion. Each mounting plate 85 contains an upwardly open, angular suspension slot 67. The suspension slot has a vertical insertion slot 88 which merges in a preferably smaller horizontal locking slot 89 oriented to the right in FIG. 4 in both mounting plates 85. The vertical insertion slot 88 is for example substantially wider than the projection 83 for tolerance compensation, but smaller than its head 84. The horizontal locking slot 84 extending to the right is smaller than the head 84 and for example is dimensioned as the cross-section of the projection 83. In this manner the filter 10 with the head 84 can move on the associated mounting plate 85 and the head 84 can be inserted in the insertion slot 88. During subsequent movement to the right the projection 83 is inserted in the horizontal locking slot 89 which extends to the right and the thickened head 84 overlaps the mounting plate 85 in the region of the locking slot 89 at the rear side. The filter 10 is reliably fixed against movements in the vertical direction and to the right. In the horizontal locking slot 89 a synthetic plastic elastic arresting can be formed for example by narrowing of the mouth region in the insertion slot 88. After insertion of the projection 83 in the locking slot 89 it can be arrested from behind and secured against horizontal withdrawal.

The above mentioned filter 10 operates as alternating lifting-lowering filter. Due to its design as an inner filter it can be suspended in a fast and simple manner in an aquarium tank 11 and in any desired point. It performs a multi-stage cycle of the filtering. The aquarium water to be cleaned is withdrawn from the first filter container 31 after an action time in the next filter container 32 located above, and then a repeated filtering is performed. The control of the cyclic lifting-lowering process per each filter container 31, 32 is performed by the associated overflow suction lifting device 23 or 24 is executed without mechanically actuated or movable parts. No wear therefore occurs. There is no danger that the respective clamps can be clamped and gaps provided for movement of respective parts are jammed or other disturbances occur. The overflow aspiration lifting devices 23, 24 are maintenance-free. They operate reliably and continuously so that the filter 10 is disturbance-free over a long time and can operate without cleaning, maintenance or the like. The filter 10 is simple and cost effective. Since the filter containers 31, 32 and three or more filter containers as well as further filter containers are identical and interchangeable, the costs are reduced further. The filter 10 forms an open filtering system in which individual filter containers 31, 32 are formed as open baths with overflow aspiration lifters and are not sealed with respect to one another and also relative to the housing 14 of the filter 10. Such seals are not required, which further contributes to lower expenses and to simplification for easier mounting and dismounting. It can be seen that the water flows from the aquarium tank 11 under the force of gravity into the housing 14 of the filter 10, and particularly in the region of the supply 20. Therefore, no special mechanical devices are needed. The individual filter thoughflow cycles are dependent on the power of the pump 21. The pump 21 runs preferably continuously. Therefore the danger of an eventual dry running is prevented by the bypass conduit 62 with the float-controlled valve device 63. The valve device 63 opens automatically and unfiltered water is aspirated through the bypass conduit 62 from the pump 21 and then again supplied to the conduit 22. Since the water flows through several filter containers 31, 32 placed under one another and when needed through further filter containers, a good filter action is obtained. In addition a longer air action time is obtained, resulting in a stronger oxygen enrichment of the water to be cleaned. It achieves a high filter output with great operational safety over a long time.

It will be understood that each of the elements described above, or two or more together, may also find a useful application in other types of constructions differing from the types described above.

While the invention has been illustrated and described as embodied in a filter for an aquarium, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A filter for aquarium, comprising a housing having a bottom chamber and at least one filter compartment for a filter material, said at least one filter compartment being located above said bottom chamber; means forming a supply opening supplying water from said aquarium to said filter compartment so that said water passes and filter compartment and flows to said bottom chamber; means for pumping water from said bottom chamber back into said aquarium, said at least one filter compartment having at least one overflow aspiration lifting device, said overflow aspiration lifting device having a substantially vertical outlet pipe extending from said bottom chamber and having a lower end which forms an outlet opening, said overflow aspirating lifting device also having an upwardly closed outer pipe which is arranged over said outlet pipe to form a radial ring space, said outer pipe having a closed upper side which extends above an open upper end of said outlet pipe at a distance therefrom to form an axial overflow chamber, said outer pipe having an inlet located at a base side and substantially at a height of a bottom of said filter compartment; and at least one bypass conduit which connects said bottom chamber with said supply opening, said bypass conduit having an end leading to said bottom chamber and provided with a float-controlled value device.

2. A filter as defined in claim 1, wherein said outlet opening of said overflow aspiration lifting device opens toward said bottom chamber.

3. A filter as defined in claim 1, wherein said pumping means includes a pump and a conduit connected with said pump so that the water is supplied by said pump into the aquarium through said conduit.

4. A filter as defined in claim 3, wherein said conduit through which water flows back from said bottom chamber into said aquarium tank is arranged centrally relative to said housing and extends from said pump through said filter compartment substantially to a height of said supply and is guided outwardly.

5. A filter as defined in claim 4, wherein each of said filter compartments has a filter container, said conduit extends through said filter container.

6. A filter as defined in claim 4, wherein said housing has a housing wall, said conduit extending outwardly transversely through said housing wall.

7. A filter as defined in claim 3, wherein said at least one filter compartment has a filter container, said filter container having a tubular part extending from said bottom, said conduit extending through an opening in said bottom and through said tubular part of said filter container upwardly.

8. A filter as defined in claim 7, wherein said tubular part is formed of one piece with said bottom.

9. A filter as defined in claim 7, wherein each of said tubular part has an upper end provided with a handle for engaging by hand.

10. A filter as defined in claim 9, wherein said handle projects over an upper edge of said filter container.

11. A filter as defined in claim 3, wherein said conduit has an outlet region provided with a movable and adjustable outlet pipe.

12. A filter as defined in claim 11, wherein said outlet pipe includes two pipe pieces which are connected in one piece with one another and extend at an obtuse angle relative to one another.

13. A filter as defined in claim 12; and further comprising a spherical joint which adjustably holds said outlet pipe.

14. A filter as defined in claim 13, wherein said spherical joint has a spherical trough provided on said tubular part and a spherical segment received in said spherical trough and provided on said outlet pipe.

15. A filter as defined in claim 14, wherein said housing has a housing wall, said tubular part with its spherical trough and said outlet pipe is releasably inserted in said housing wall.

16. A filter as defined in claim 15, wherein said housing wall has an upwardly open recess, said tubular part with said spherical trough and said outlet pipe being releasably inserted in said upwardly open recess ofsaid housing wall.

17. A filter as defined in claim 11, wherein said outlet pipe is arranged at a distance above said supply.

18. A filter as defined in claim 1; further comprising at least two such filter compartments located one above the other, wherein said outlet of said overflow aspiration lifting device of an upper one of said filter compartments opens into a lower one of said filter compartments and forms a water supply for the latter while said outlet of said lower filter compartment opens in said bottom chamber.

19. A filter as defined in claim 1, wherein said overflow aspiration lifting devices in all said filter compartments are located at the same side, and said bottom of each of said filter compartments is inclined to said inlet of an associated one ofsaid overflow aspirating lifting devices.

20. A filter as defined in claim 1, wherein each of said filter compartments has a filter container which is formed as a substantially open container.

21. A filter as defined in claim 20, wherein said filter containers of said filter compartments are identical and removably held in said housing.

22. A filter as defined in claim 1, wherein said lower end extends through said bottom downwardly.

23. A filter as defined in claim 1, wherein said outlet pipe is formed of one piece with said bottom.

24. A filter as defined in claim 1, wherein said upper side of said outer pipe is inclined downwardly toward said filter container.

25. A filter as defined in claim 1, wherein said upper side of said outer pipe has upwardly projecting guiding walls which limit an inclined water guiding trough.

26. A filter as defined in claim 1, wherein said outer pipe at its upper side has a substantially shovel-like cross-section.

27. A filter as defined in claim 1, wherein said outer pipe has a peripheral casing with openings which form said inlet of said overflow aspiration lifting device.

28. A filter as defined in claim 27, wherein said openings have a substantially torus arc shape.

29. A filter as defined in claim 1, wherein said valve pipe is mounted releasably.

30. A filter as defined in claim 1, wherein said bottom chamber has side wall parts provided with upwardly projecting supporting webs for vertically supporting said filter compartment.

31. A filter as defined in claim 1, wherein said bottom chamber has inner side walls with vertically projecting supporting webs, said filter compartment having a filter container which is vertically supported on said supporting webs.

32. A filter as defined in claim 1; and further comprising at least one second such filter compartment, each of said filter compartments having a filter container, said filter containers being vertically arranged over one another and supported at opposite sides.

33. A filter as defined in claim 1, wherein said pumping means include a pump which is arranged inside said bottom chamber.

34. A filter as defined in claim 1 wherein said valve device has a float ball which depending on a water level in said chamber and a swimming position of said float ball closes opens said bypass conduit.

35. A filter as defined in claim 34, wherein said bypass conduit has a conduit end, said floating ball being arranged to close and open said conduit end of said bypass conduit.

36. A filter as defined in claim 35; and further comprising a cage which freely movably holds said float ball at said conduit end of said bypass conduit.

37. A filter as defined in claim 34; and further comprising base webs extending upwardly from said bottom of said bottom chamber and vertically supporting said float ball in an open position.

38. A filter as defined in claim 1, wherein said filter compartment has a filter container, said bypass conduit being composed of individual pipe pieces which are inserted in one another and arranged on said filter container.

39. A filter as defined in claim 38, wherein said pipe pieces of said bypass conduit are formed of one piece with said filter container.

40. A filter as defined in claim 1; and further comprising at least two of said filter compartments located one above the other, said supply of an upper one of said filter compartments having a box-shaped cage with a wall provided with passages for inflow of surrounding water into said cage.

41. A filter as defined in claim 40, wherein said filter compartments have filter containers, said supply of said filter containers having said box-shaped cage.

42. A filter as defined in claim 40, wherein said box-shaped cage is releasably inserted in said filter compartment.

43. A filter as defined in claim 40 wherein said wall of said box-shaped cage is one of a front wall and an inclined side wall of said cage.

44. A filter as defined in claim 40, wherein said openings of said cage are formed as slots.

45. A filter as defined in claim 40, wherein said cage has an inner transverse wall located at a bottom side and provided with an outlet opening with a size providing a supply quantity of water in said upper filter compartment.

46. A filter as defined in claim 45, wherein said outlet opening is arranged to provide a supply quantity of water into said filter container of said upper filter compartment.

47. A filter as defined in claim 45; and further comprising a guiding trough provided on said inner transverse wall and extending inwardly for guiding supplied water.

48. A filter as defined in claim 47, wherein said guiding trough has a substantially U-shaped cross-section.

49. A filter as defined in claim 40, wherein said cage has a bottom opening and a connecting pipe surrounding said bottom opening; and further comprising a bypass conduit with a tubular piece provided in said upper filter compartment and connected with said connecting pipe.

50. A filter as defined in claim 44, wherein said upper filter compartment has a filter container provided with said bypass opening with said tubular piece.

51. A filter as defined in claim 1, wherein said supply has a cage; and further comprising an outer passage which is closed from an interior of said housing and extends substantially to a bottom level of said housing, said outer passage extending upwardly and having an upper end connected with said cage.

52. A filter as defined in claim 51, wherein said outer passage has a plurality of openings for inflow of surrounding water into said outer passage.

53. A filter as defined in claim 52 wherein said outer passage has a lower region provided with said openings.

54. A filter as defined in claim 52, wherein said openings of said outer passage are formed as slots.

55. A filter as defined in claim 1, wherein said housing has an upper end; and further comprising a cover releasably covering said upper end of said housing.

56. A filter as defined in claim 55, wherein said cover is formed as an insulating plate.

57. A filter as defined in claim 55, wherein said cover is provided with an insulating plate.

58. A filter as defined in claim 1; and further comprising a suspension holder provided with mushroom shaped projections and a mounting plate having an angular suspension slot with a vertical insertion slot merging into a horizontal locking slot.

59. A filter as defined in claim 1, wherein said horizontal locking slot is smaller than said vertical insertion slot.

60. A filter as defined in claim 59, wherein said horizontal locking slot is formed so that when said projection engages in said locking slot it is arrested in said locking slot.

61. A filter as defined in claim 59, wherein said housing has a housing wall and said aquarium has an aquarium wall, said mushroom shaped projections being provided on said housing wall, while said mounting plate is mounted on said aquarium wall.

62. A filter as defined in claim 61, wherein said projections are releasably mounted on said housing wall.

63. A filter as defined in claim 61, wherein said mounting plate is adhesively mounted on said aquarium wall.

64. A filter as defined in claim 1, wherein the filter is composed of a synthetic plastic material.

65. A filter as defined in claim 1; and further comprising at least one second such filter compartment located below said first mentioned filter compartment, said outlet opening of said outlet pipe being open to said second filter compartment.

* * * * *